S. A. ESKILSON.
INLET DEVICE FOR THE WHOLE MILK IN CENTRIFUGAL APPARATUS.
APPLICATION FILED JAN. 17, 1920.

1,335,784.

Patented Apr. 6, 1920.

Inventor:
Sven August Eskilson
By Lawrence Langner
Attorney.

UNITED STATES PATENT OFFICE.

SVEN AUGUST ESKILSON, OF STOCKHOLM, SWEDEN, ASSIGNOR TO AKTIEBOLAGET SALENIUS' WERKSTÄDER, OF STOCKHOLM, SWEDEN, A CORPORATION OF SWEDEN.

INLET DEVICE FOR THE WHOLE-MILK IN CENTRIFUGAL APPARATUS.

1,335,784.  Specification of Letters Patent.  Patented Apr. 6, 1920.

Application filed January 17, 1920. Serial No. 352,154.

*To all whom it may concern:*

Be it known that I, SVEN AUGUST ESKILSON, a subject of the King of Sweden, and resident of Torstensonsgatan 4, Stockholm, in the Kingdom of Sweden, have invented certain new and useful Improvements in Inlet Devices for the Whole-Milk in Centrifugal Apparatus, of which the following is a specification, reference being had therein to the accompanying drawing.

In cream separators hitherto used, and particularly in separators of the type, which have no liner, the milk generally is led into a cup fixed to or made integral with the top end of a hollow upright extending from the bottom of the centrifugal drum and containing a bushing for the driving spindle of the drum, from which cup the milk then passes into the drum through a pipe brazed to the said upright and opening into the drum at the bottom of the same. The said arrangement involves the disadvantage of rendering difficult the cleaning of the said cup and the pipe. The object of this invention is to remove the said disadvantage, which is effected by making the cup and the inlet pipe or channel in the form of a sleeve threaded on the upright and extending above the same, the said sleeve being provided with one or more longitudinal corrugations, which together with the upright constitutes one or more channels for conducting the milk downward. The lower end of the said corrugation extends outward from the sleeve and forms a lip which faces downward and which conducts the milk outward to the milk layer in the rotating drum.

Figure 1:
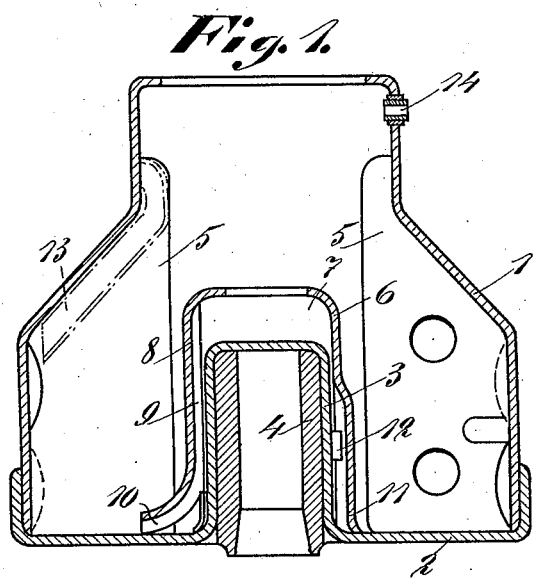
Figure 2:
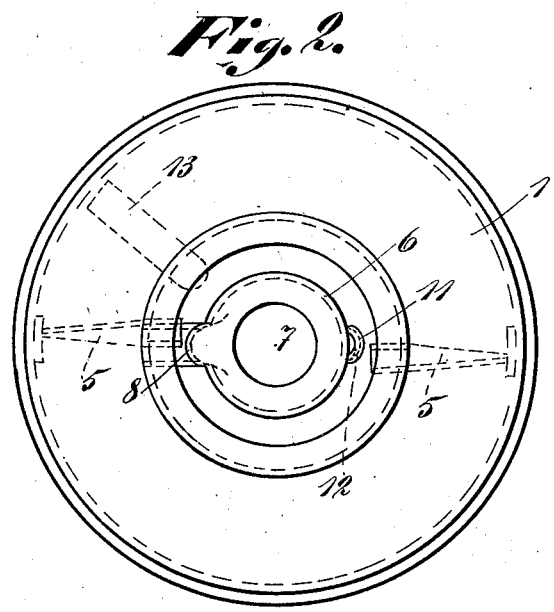

Figure 1 in the accompanying drawing shows in a vertical section a centrifugal drum arranged in accordance with this invention. Fig. 2 is a plan view of the drum.

From the bottom 2 of the centrifugal drum 1 a hollow upright 3 extends, which is closed at its top end and contains a bushing 4 for the driving spindle of the drum. The said drum is provided with wings 5, causing the milk to participate in the rotary motion of the drum. According to this invention a sleeve 6 is threaded on the upright 3 and extends above the same. The top edge of the said sleeve is bent inward. The sleeve together with the top end of the upright form the cup 7, into which the whole milk is delivered. The sleeve 6 is provided with one or more corrugations or grooves 8 extending longitudinally of the sleeve and uniting with the uprights 3 forming a channel or channels 9, extending downward from the cup 7. The lower end of the corrugation extends outward from the sleeve and forms a grooved or channeled lip 10 having the bottom turned upward. In order that the sleeve may be put into proper position on the upright the sleeve is provided with a second corrugation 11, which does not extend upward right to the cup 7, as the sleeve is threaded on the upright, but engages a projection 12 provided on the upright.

The whole milk is delivered into the cup 7 and then passes through the channel 9 and the groove 10 into the drum. Owing to the centrifugal force the milk follows the upward turned bottom of the groove 10, in consequence whereof the groove may be open at its lower side, as shown. The blue milk leaves the drum through a pipe 13 and the cream passes through a screw 14 in the ordinary manner. When the drum is to be cleaned the sleeve 6 is removed from the drum, whereupon the latter may be rinsed and the sleeve and its corrugation may easily be cleaned inside by means of a brush. Consequently, the cleaning of the drum as a whole may easily be effected.

Having now described my invention, what I claim as new and desire to secure by Letters Patent is:

1. In a centrifugal separator, the combination of a centrifugal drum formed at its bottom with a central, hollow upright which is closed at its top; a sleeve fitted over said upright and having an open upper end constituting an inlet for the whole milk, said sleeve resting at its lower end upon the drum bottom and being formed at said end with an outwardly-extending grooved lip; and a longitudinal corrugation formed on said sleeve in line with said lip and extending from top to bottom thereof, said corrugation co-acting with said upright in providing a longitudinal channel between the sleeve and the upright which opens at its lower end into the grooved face of the lip to permit the whole milk supplied through said inlet to flow downward through said channel and said lip and escape through the latter into the drum.

2. In a centrifugal separator, the combination of a centrifugal drum formed at its bottom with a central hollow upright which is closed at its top; a sleeve fitted over said upright and having an open upper end constituting an inlet for the whole milk, said sleeve resting at its lower end upon the drum bottom and being formed at spaced points with a pair of longitudinal corrugations, one of which extends from top to bottom of the sleeve and co-acts with the upright in providing a longitudinal channel between the sleeve and upright, through which the whole milk supplied through said inlet is adapted to flow; an outwardly-extending grooved lip formed on the lower end of said sleeve in register with the lower end of said longitudinal channel to provide an outlet therefrom for the milk; and a locking projection on said upright extending into the other corrugation on the sleeve.

In witness whereof, I have hereunto signed my name.

SVEN AUGUST ESKILSON.